C. P. LLOYD.
Bee Hive.
No. 62,043.　　　　　　　　　　　　　　Patented Feb. 12, 1867
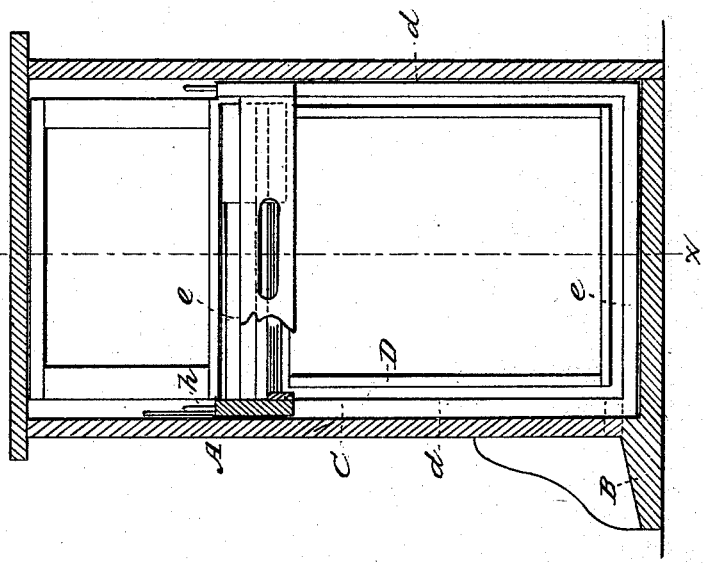
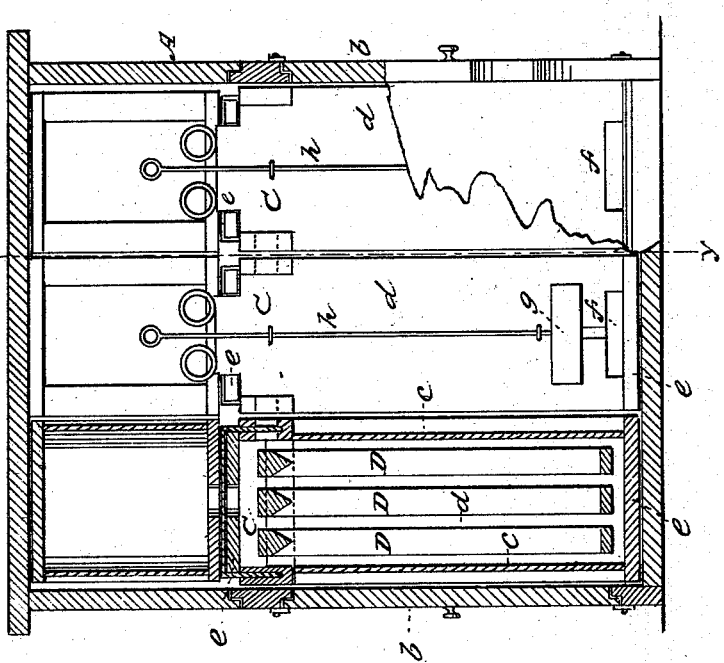
Witnesses:　　　　　62,043　　　　　Inventor:

United States Patent Office.

C. P. LLOYD, OF PORTSMOUTH, OHIO.

Letters Patent No. 62,043, dated February 12, 1867.

---

IMPROVEMENT IN BEE-HIVES.

---

The Schedule referred to in these Letters Patent and making part of the same.

---

TO ALL WHOM IT MAY CONCERN:

Be it known that I, C. P. LLOYD, of Portsmouth, Scioto county, State of Ohio, have invented a new and improved Bee-Hive; and I do hereby declare that the following is a full, clear, and exact description thereof, which will enable others skilled in the art to make and use the same, reference being had to the accompanying drawing, forming part of this specification, in which—

Figure 1 is a vertical section of my invention taken in the line $x$ $x$, fig. 2.

Figure 2, a vertical section of the same taken in the line $y$ $y$, fig. 1.

Similar letters of reference indicate like parts.

This invention relates to a new and improved bee-hive of that class which are provided with removable boxes; and it consists in having the sides of said boxes of glass, and each box provided with a slide and a series of movable comb-frames, and all arranged as hereinafter fully shown and described, whereby any one of the boxes may be removed from the hive, and the condition of the bees examined, without any risk of being stung, or without killing or injuring the bees.

A represents the body or case of the hive, which may be of quadrilateral form, and of any suitable dimensions, and provided at one side, at its lower part or bottom, with an alighting board, B, which is in front of bee entrances, $a$. The sides or ends of the body or case $a$ are provided with doors, $b$, and within said body or case there is placed a series of boxes, C, the sides, $c$, of which are of glass, and the front and rear ends $d$, as well as the top and bottom $e$, of wood. Three boxes C are represented in fig. 1, but more or less may be used; and each box has an opening, $f$, in the lower part of its front end, and these openings may be closed when desired, by slides, $g$, which have rods, $h$, attached, the latter extending up to the tops of the boxes C. Each box C is provided with a series of comb-frames, D, which are suspended within the boxes C, and are capable of being removed at pleasure, the tops $e$ of the boxes being detachable for that purpose. By this arrangement the boxes C may be removed, any one or all of them, as occasion may require. The slides $g$ being closed, the bees cannot escape, and the boxes may be taken out of the case A, and the condition of the bees examined, without the least danger of being stung. Colonies of bees, also, may be multiplied at will, by transposing the boxes, taking one or more from an inhabited hive and placing them in an empty one, and swarming consequently prevented.

I do not claim removable or detachable comb-frames, for they have been previously used; nor do I claim broadly a sectional hive, or one composed of or provided with removable boxes; but I do claim as new, and desire to secure by Letters Patent—

The combination of the boxes C, with sides as described, and openings $f$, slides $g$, and suspended detachable frames D, constructed and operating substantially as and for the purpose specified.

C. P. LLOYD.

Witnesses:
R. LLOYD,
S. E. EVANS.